United States Patent [19]

Gould et al.

[11] Patent Number: 5,404,565
[45] Date of Patent: Apr. 4, 1995

[54] MESSAGE TRACKING IN A PARALLEL NETWORK EMPLOYING A STATUS WORD AT EACH NODE WHICH REFLECTS A MESSAGE'S PROGRESS

[75] Inventors: Joel M. Gould, Winchester; Neal M. Lackritz, Burlington, both of Mass.

[73] Assignee: International Business Machines Corporation, Armonk, N.Y.

[21] Appl. No.: 197,004

[22] Filed: Feb. 15, 1994

Related U.S. Application Data

[63] Continuation of Ser. No. 741,546, Aug. 7, 1991, abandoned.

[51] Int. Cl.$^6$ ............................................. G06F 13/00
[52] U.S. Cl. ................................ 395/800; 395/200; 370/94.1; 364/DIG. 1; 364/221.7; 364/242.94; 364/259; 364/259.1
[58] Field of Search ................... 395/200, 800, 725; 370/94.1–94.3, 85.13, 60

[56] References Cited

U.S. PATENT DOCUMENTS

| | | | |
|---|---|---|---|
| 3,623,067 | 11/1971 | Deal et al. | 340/324 |
| 4,545,013 | 10/1985 | Lyon et al. | 364/200 |
| 4,755,995 | 7/1988 | Anderson et al. | 371/9 |
| 4,766,534 | 8/1988 | DeBenedictis | 364/200 |
| 4,814,979 | 3/1989 | Neches | 364/200 |
| 4,825,206 | 4/1989 | Brice, Jr. et al. | 340/825.02 |
| 4,845,744 | 7/1989 | DeBenedicts | 379/221 |
| 4,847,837 | 7/1989 | Morales et al. | 371/8 |
| 4,864,563 | 9/1989 | Pavey et al. | 370/94.1 |
| 4,885,739 | 12/1989 | Reed et al. | 370/58.1 |
| 4,890,222 | 12/1989 | Kirk | 395/550 |
| 4,914,571 | 4/1990 | Baratz | 369/200 |
| 4,982,187 | 1/1991 | Goldstein et al. | 340/825.79 |
| 5,008,882 | 4/1991 | Peterson et al. | 370/94.3 |
| 5,018,137 | 5/1991 | Backes et al. | 370/85.13 |
| 5,077,730 | 12/1991 | Arrowood et al. | 370/16 |
| 5,079,767 | 1/1992 | Perlman | 370/94.3 |
| 5,111,198 | 5/1992 | Kaszmaul | 370/94.1 |
| 5,181,017 | 1/1993 | Frey, Jr. et al. | 340/825.02 |
| 5,191,578 | 3/1993 | Lee | 370/63 |
| 5,191,650 | 3/1993 | Kramer et al. | 395/200 |
| 5,197,011 | 3/1993 | Biemans et al. | 364/468 |
| 5,293,377 | 3/1994 | Gould | 370/94.1 |

OTHER PUBLICATIONS

Larry Hughes, "LAN Gateway Designs for Multicast Communication", IEEE Computer Society Press, Proceedings of the 13th Conference on Local Computer Networks, Aug. 1988, pp. 82–91.

*Primary Examiner*—Alyssa H. Bowler
*Assistant Examiner*—Melmet Geckil
*Attorney, Agent, or Firm*—Perman & Green

[57] ABSTRACT

A multiple node network is described wherein messages are transmitted between source and intermediate nodes to a destination node, the network including a message progress reporting system which employs a status word that enables the source node to determine a message's progress. Each parent node comprises a status word register for reporting a status word that indicates the progress of the message. The parent node further includes a routing mechanism for receiving a status word from a child node that indicates the message's progress in the child node and at succeeding nodes thereafter. The routing mechanism updates the status word in the status word register in accordance with the received status word. The routing mechanism further transmits the updated status word from the parent node to a source node upon the parent node having received status words from all child nodes to which the parent node transmitted the message whereby each succeeding parent node does not transmit its status word until all succeeding nodes have accumulated their status words and reported upward in the tree.

11 Claims, 4 Drawing Sheets

MESSAGE TRACKING IN A PARALLEL NETWORK EMPLOYING A STATUS WORD AT EACH NODE WHICH REFLECTS A MESSAGE'S PROGRESS

This is a continuation of application Ser. No. 07/741,546, filed on Aug. 7, 1991, now abandoned.

FIELD OF THE INVENTION

This invention relates to multi-dimensional, parallel computer networks, and more particularly, to a method and system for reporting maximum message progress in such computer networks.

BACKGROUND OF THE INVENTION

As an aid to understanding the prior art, a schematic representation of a multi-dimensional, parallel computer network is shown in FIG. 1. Each of boxes 0–8 is a data processing site called a node, which nodes may be homogeneous or heterogeneous. Each of nodes 0–8 must be able to receive data blocks from other nodes and send data blocks to other nodes. Data links interconnect the nodes in either a regular or irregular pattern. In FIG. 1, lines 100–111 between nodes 0–8 schematically represent such data links.

The prior art indicates many possible ways of finding message routes between source and destination nodes. In general, all such ways assume that a message always tries to make progress towards the destination node. In practice, the search paths established during the time the network attempts to route a message from a source node to a destination node is unimportant. All that the source node generally needs to be informed of is whether a path was found over which to transmit the message. If no path is found, the source node is only concerned with the maximum progress the message made through the network in order to determine a proper recovery action.

In FIG. 2, an exemplary search tree is illustrated. Assume node 0 in FIG. 1 is to send a message to node 8 using redundant paths in order to protect against network congestion and faults. Several parallel paths exist between these two nodes, as shown in FIG. 2. Initially, a message is sent from node 0 to node 1 using link 100 (see FIG. 1). In parallel, node 0 also sends the message to node 3 using link 106. After arriving at node 1, the message is sent to node 2 using link 101 and to node 4 using link 107. Similarly, node 3 passes the message onto node 4, using link 102 and to node 6 using link 109. A repetition of this process enables all possible paths from node 0 to node 8 to be found. This search technique creates a search tree of paths, as illustrated in FIG. 2. Node 0 is at the root of the tree since it is the source node. Nodes 1 and 3 are children of node 0 because node 0 can use either of them as part of a path to node 8. Node 1's children are nodes 2 and 4. Similarly, node 3's children are nodes 4 and 6. Node 8 is the ultimate destination node of each search branch.

There are many techniques for network implementation which provide methods for handling contention between nodes. For instance, in U.S. Pat. No. 4,814,979 to Neches, all messages occupy places in a coherent priority scheme and are transferred in contending groups, with assigned priority, on the network. The relative message priorities are then employed to determine which message advances through the network at the cost of other messages. In U.S. Pat. No. 4,847,837 to Morales et al., redundant data paths are employed with a master switch deciding which one of the redundant paths is to be employed for transmitting and receiving messages between nodes.

In U.S. Pat. 4,766,534 to DeBenedictis a message-passing, parallel processing system between a plurality of nodes is described. Messages are passed between processing nodes in fixed size blocks and only when input buffers are empty is such a message enabled to pass. Flow control of the network is thus self-regulating and deadlocks are avoided. U.S. Pat. Nos. 3,623,067 to Deal, Jr. et al. and 4,545,013 to Lyon et al. show multi-dimensional processing systems wherein system status is employed to influence message transmissions. In the Deal, Jr. et al. patent, parallel connected network lines are employed to enable processors to report to a master system and indicate the status of a particular transaction. The master system then uses the status indication to enable further message transmissions. In Lyon et al., the processing system automatically monitors the status of the network and each of its component units, by periodically polling the network for changes of status and updating the information in a network configuration table.

In many networks, a message is positively acknowledged when it reaches a destination node, with an acknowledgement being transmitted back along the path used to transmit the message. Thus, a source node enqueues its message into the network and starts a countdown timer. If the positive acknowledgement is received before the timer expires, the message transmission is considered successful. If the timer expires before an acknowledgement is received, the message transmission is considered a failure and the message is resent. The problem with this scheme is that the source node only knows if the message transmission succeeded or failed. Message failure may have been caused by a variety of reasons, including network congestion, broken links, transmission errors, node errors etc. Since the source node does not know the cause of the failure or the maximum message progress, its only option is to attempt to resend the message or abort the message.

Some single-dimensional (one path) networks return specific status words when a message transfer has failed. Such a message does not scale to multi-dimensional networks where multiple paths fail. More specifically, where multiple paths fail, the source node must process every error that occurs on every search path, thereby requiring considerable allocation of processing time to unsuccessful message transmission tries. One technique for refining this scheme is to allow intermediate nodes to accumulate error reports and pass only the most severe error report to its parent node. While this scheme reduces the acknowledgement message traffic, the source node is only informed of the most severe error occurring on any search branch without any information regarding message progress being reported.

Accordingly, it is an object of this invention to provide a message progress reporting system for a multi-dimensional, computer network which minimizes the amount of network bandwidth required for progress reporting.

It is another object of this invention to provide a system for message progress reporting in a parallel computing network which is adapted to accommodate multiple search trees passing through any node and to be adaptable to any width or depth of a search tree within a network.

It is yet another object of this invention to provide a system for reporting message progress in a parallel computing network wherein only a single status indication between nodes is employed to encapsulate the maximum progress of the message.

A still further object of this invention is to provide a system for reporting message progress in a parallel computing network which can operate in a network where each message transfer is acknowledged or in a network wherein only negative acknowledgements (i.e. error reports) occur.

SUMMARY OF THE INVENTION

A multiple node network is described wherein messages are transmitted between source and intermediate nodes to a destination node, the network including a message progress reporting system which employs a status word that enables the source node to determine a message's progress. Each parent node comprises a status word register for reporting a status word that indicates the progress of the message. The parent node further includes a routing mechanism for receiving a status word from a child node that indicates the message's progress in the child node and at succeeding nodes thereafter. The routing mechanism updates the status word in the status word register in accordance with the received status word. The routing mechanism further transmits the updated status word from the parent node to a source node upon the parent node having received status words from all child nodes to which the parent node transmitted the message whereby each succeeding parent node does not transmit its status word until all succeeding nodes have accumulated their status words and reported upward in the tree.

DETAILED DESCRIPTION OF THE INVENTION

Figure 3:
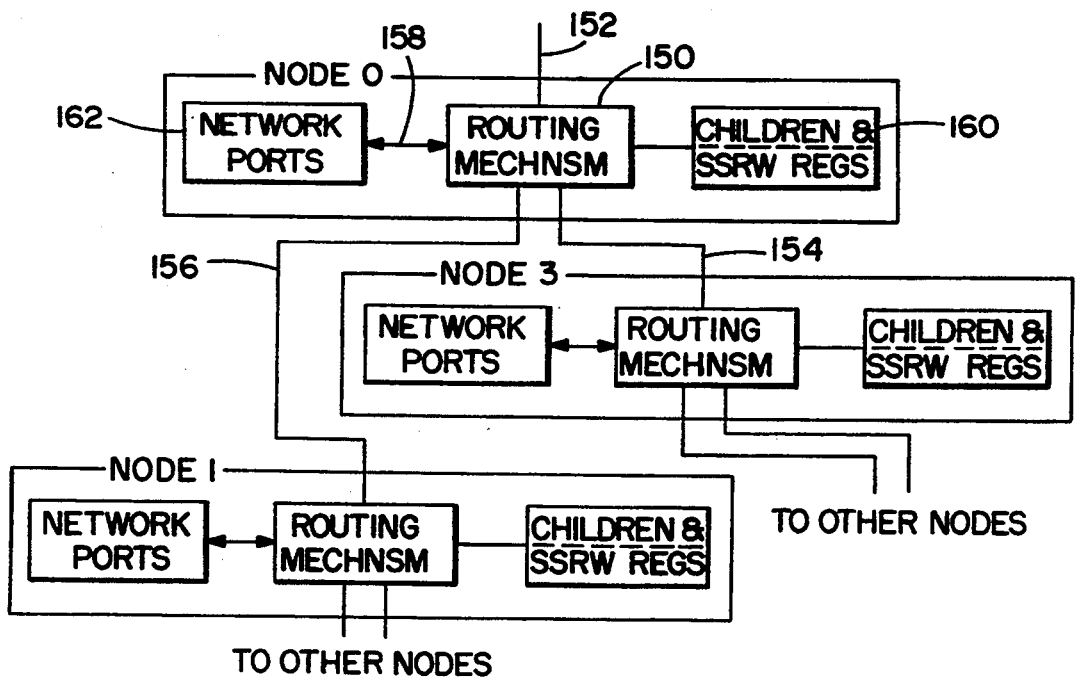
FIG. 3 is a schematic illustrating representative node structures.

Referring now to FIG. 3, a high level block diagram of nodes 0, 1 and 3 is shown. Each node includes an inter-node routing mechanism 150, inter-node links 152, 154, 156, inter-node connections 158 and at least two sets of special registers i.e. Children and Search Status Result Word (SSRW) registers 160. Each of those registers will be considered in detail below. Each node further includes one or more network ports 162 that provide a bidirectional interface between other apparatus located at the node and inter node routing mechanism 150.

Each link between nodes can serve as either an input link or an output link, depending upon the direction of message transfer between nodes. Both network ports and input links can serve as sources of data to inter-node routing mechanism 150. An output link or a network port can also serve as a recipient of data from inter-node routing mechanism 150.

Figure 4:
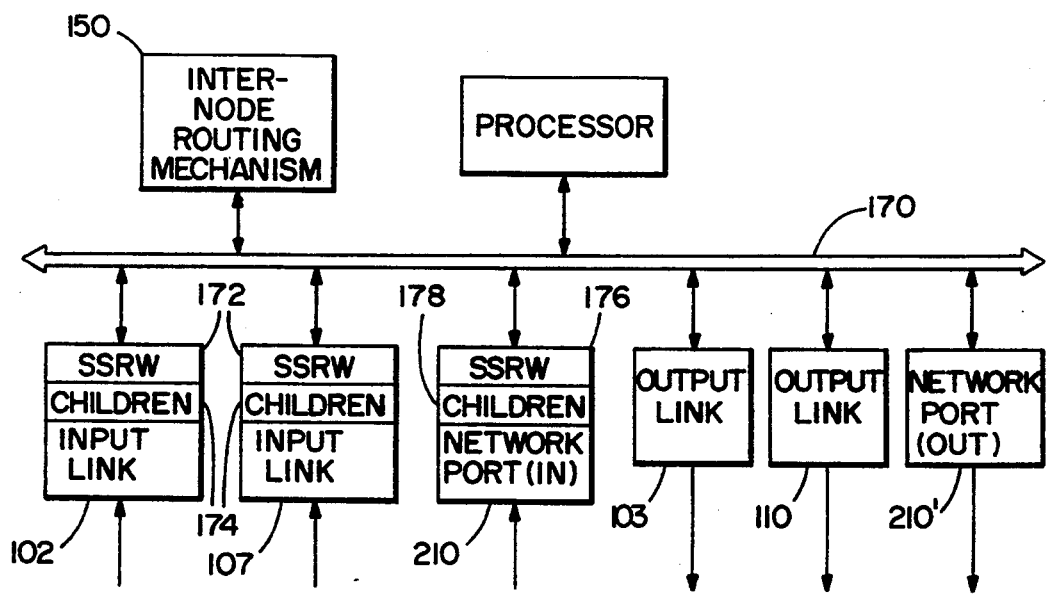
FIG. 4 is a block diagram of a nodal data transmission/reception structure.

There is a unique Children and SSRW register associated with every input link and every network port to enable implementation of the invention. These registers extend upon the prior art feature of child nodes returning certain status information to a parent node. This will be better understood by referring to FIG. 4 wherein a more detailed block diagram of node 4 is shown.

Inter-node routing mechanism 150 is connected to a bus 170 to which input links 102, 107 and output links 103 and 110 are also connected. A network port having an input portion 210 and output portion 210' is also connected to bus 170. Each of input links 102 and 107 is provided with an SSRW register 172 and a Children register 174. In a similar manner, network port (in) 210 is likewise supplied with SSRW and Children registers 176 and 178 respectively. Each SSRW register is a bit mask whose individual bits represent progress through the network. Each Children register is a bit mask that represents the output paths over which a given input source transmitted a message. Every output link and network port within node 4 is assigned a unique bit in each Children register. If such bit is set, then the source (input) link/port is sending data to the output link represented by that bit. Multiple bits in a Children register may be set if the source (input) link/port is sending data to multiple output links. In essence, Children registers are employed within a node to enable the node to know where a specific message has been transmitted and, in addition, to know when all message recipients have reported back an SSRW to the respective node.

The SSRW registers, as aforedescribed, are bit masks that are used to combine SSRW values returned from children nodes. As SSRW values are received, they are OR'd into the SSRW register so that only a single SSRW results after all child node SSRW values have been received. When all child nodes have returned their SSRW values, a parent node sends the accumulated SSRW up the search tree to its parent node.

Figure 1:
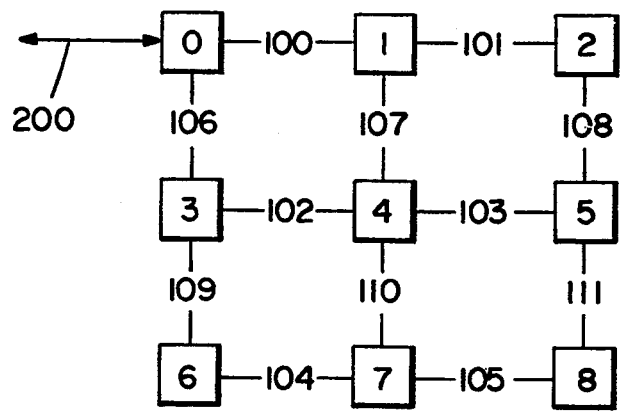
FIG. 1 is a schematic of a multi-nodal, multi-dimensional computer network.
Figure 2:
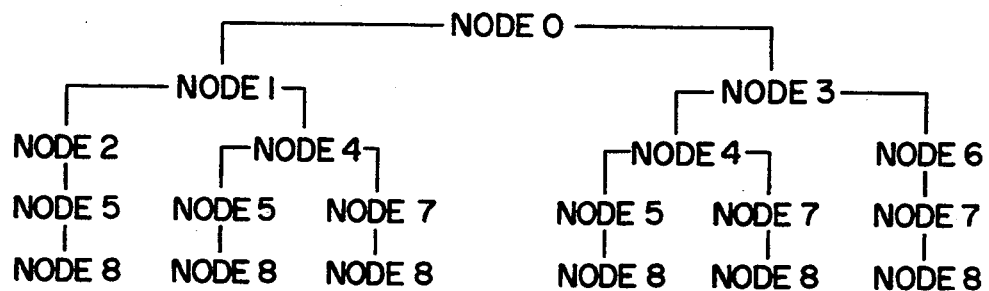
FIG. 2 is a schematic illustrating a search tree for a message transmission path between nodes 0 and 8.
Figure 5:
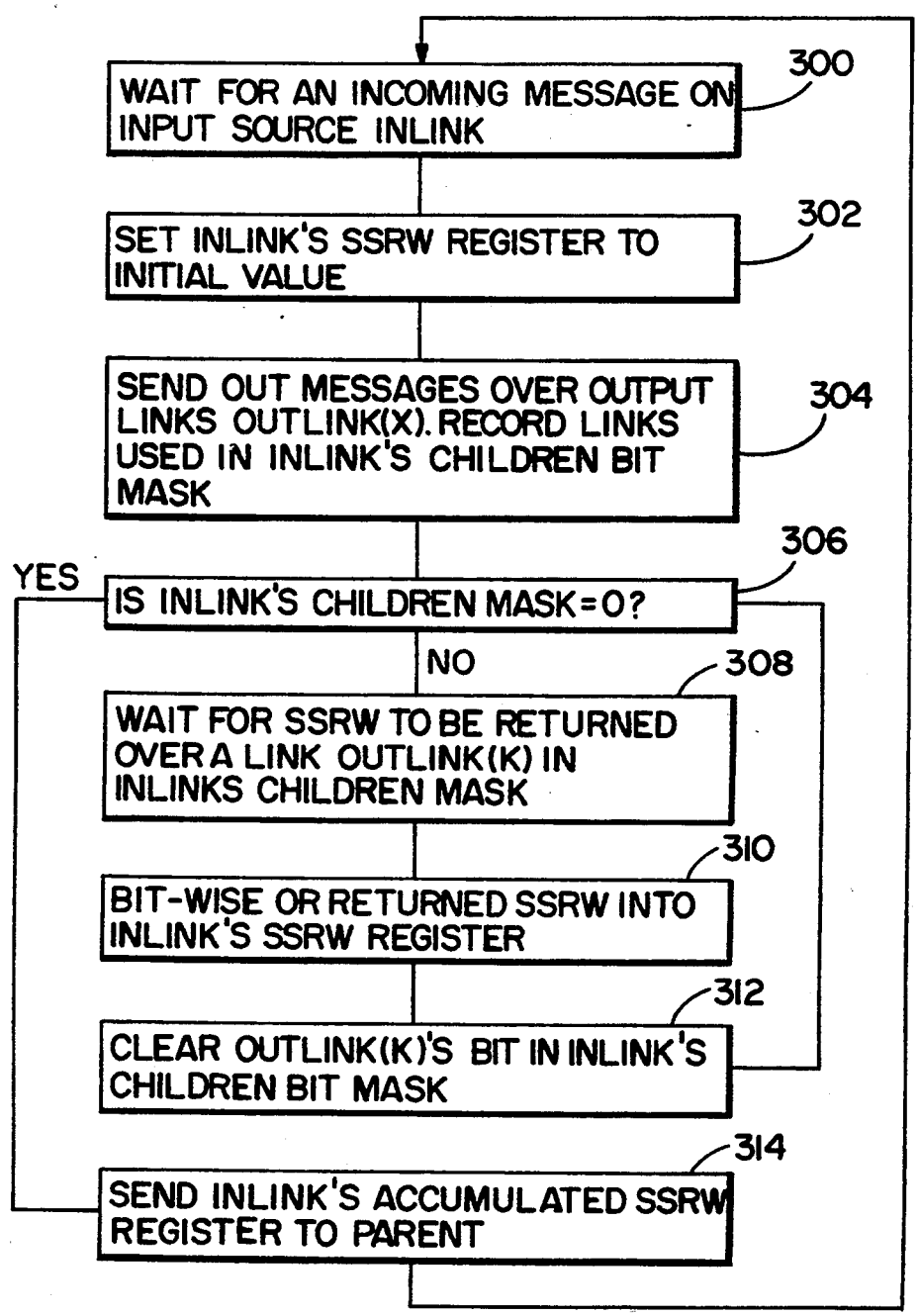
FIG. 5 is a flow diagram illustrating message progress reporting employed by the invention.

Referring now to FIGS. 1 and 5, the operation of the invention will be described by assuming that node 0 has a network port 200 which enables data to be transmitted into the Inter-node routing mechanism 150 within node 0. Inter-node routing mechanism 150 initiates a message transfer by first resetting the SSRW register associated with input network port 200 to an initial value (e.g. sets value equal to zero) to indicate that no message progress has been made through the network as yet. Inter-node routing mechanism 150 then allocates (in this example) output links 100 and 106 and transmits the message to nodes 1 and 3 using these links. The allocated output link identities are stored in the Children register associated with network port 200, with one bit being set for link 100 and one bit set for link 106.

Intermediate nodes in the message transmission follow the protocol illustrated in FIG. 5. Initially, each node is in a wait status until an incoming message appears on an input link ("inlink") as shown in box 300. Initially, each input link's SSRW register is set to an initial value (e.g., 0) as shown in box 302. When a message is received, it is transmitted over one or more output links to succeeding children nodes. The output links over which the message is transmitted are recorded in the input link's Children bit mask as shown in box 304.

As above indicated, when an SSRW is returned to a parent node from a child node, the response is noted in the parent node's Children bit mask to indicate that the response has been received. In this example, it is assumed that when a child node's SSRW response is received, the corresponding bit in the Children bit mask is set to 0. As shown in box 306, if all bit positions in an input links Children's bit mask are equal to 0, then all child nodes have reported back their SSRWs. If all bit values are not equal to 0, then the node waits (box 308) until an SSRW is returned from a child node (e.g. via output link "k"). When an SSRW is received over output link k, the SSRW is bit-wise OR'd into the input link's SSRW register (box 310). The output link (k)'s bit in the input link's Children's bit mask is then set to 0 (box 312) and the test shown in box 306 is repeated to determine if all child nodes have reported back. If not, the cycle repeats until all nodes have reported their SSRWs. At this point, the accumulated SSRW value is then transmitted back to the parent node (box 314) and the procedure continues.

Continuing the example given above, when node 1 receives node 0's message over link 100, it begins a retransmission process by first resetting the SSRW register associated with input link 100. Node 1 then retransmits the message to nodes 2 and 4 using output links 101 and 107. The Children register associated with input link 100 is updated to indicate the use of output links 101 and 107.

Every intermediate node used during the transmission of the message follows an identical process. If an intermediate node is unable to allocate any output links for retransmission of the message, the node terminates the search branch by returning its input link's SSRW to the parent node.

Eventually, the message arrives at node 8 over link 111 (or link 105). Node 8 begins by resetting the SSRW register associated with input link 111. Since node 8 is the destination node, it does not need to retransmit the message and set the Children register associated with input link 111. Instead, node 8 processes the message, setting some of the SSRW status bits within input node 111 to indicate success or failure of the processing action. Once node 8 has finished processing the message, the SSRW value in input node 111 is returned to the parent node from which node 8 received the message (i.e., node 5) and node 8 waits for the next incoming message.

Every parent node waits for a child link (an output link) to return an SSRW. The parent node scans the Children registers associated with each of its input links, searching for the input link that allocated a particular output link over which an SSRW has been received. Once found, the parent node bit-wise ORs the returned SSRW into the respective input link's SSRW register, accumulating the return status of the child node. In addition, the Children register in the input link has the bit position corresponding to the output link over which the SSRW was received set to 0, effectively deallocating that output link. When all bit positions in the Children register for the respective input link are set to 0, no further links await to report and the parent node realizes that every child node has completed its search path and that the input link's SSRW now has an accumulated status value from all of the child nodes. At this point, the parent sends the accumulated SSRW of the search tree to its parent node. At any time before it returns an SSRW up the search tree, the parent node may modify its SSRW (not shown in the flow chart).

Like the intermediate nodes, node 0 waits for a child output link (e.g., either 100 or 106) to return an SSRW. Upon receiving an SSRW, node 0 scans the Children registers associated with its input links/ports and finds network port 200 associated with either link 100 or 106 over which the SSRW was received. The returned SSRW is bit-wise OR'd into the SSRW register associated with network port 200 and the Children register associated with network port 200 is updated to reflect the fact that the SSRW has been received and the output link is then deallocated. When all bit positions in the Children register associated with network port 200 indicate a value of 0, the message transmission is complete and the message progress status is reported in the SSRW register associated with network port 200. Node 0 can then examine that SSRW value to determine whether message transmission succeeded, or if it failed, the maximum message process through the network.

SSRW STRUCTURE

A unique SSRW is associated with every input source on the node, including input links and network ports. In networks that allow multiple searches to occur in parallel, one node may be involved in several search branches from several different search trees. In this situation, the node may have several input link receivers, each talking to some set of the nodes output links and network ports. In this case, every busy receiver represents a different search path. Since every receiver has its own SSRW, the status for several separate search paths may be accumulated in parallel. The accumulated search status results of one receiver (and, therefore, of one search path) does not affect the search or status results of a second receiver and search path. The Children register bit mask is only used to keep track of which output links are associated with which input sources.

The size of the Search Status Result Word (SSRW) will vary in different implementations. Each bit of the SSRW is used to denote some progress of the message in a destination node. Using the search path and network shown in FIG. 1, as an example, SSRW bits may be assigned as follows:

* Bit 0—Message left the source node
* Bit 1—Message arrived at the destination node
* Bit 2—Message left network through network port
* Bit 3—Message successfully received by destination node In this example, Bit 0 is set by the source node whenever it transmits the message over any output link. This bit not being set implies that every output link is unavailable due to faults or congestion.

The destination node sets Bit 1 of the SSRW register when the message arrives. Message arrival at a destination node, however, does not imply the node will accept or process the message. Bit 2 is used to inform the source node that the message left through a destination node's network port. Bit 3 implies that the message was successfully received by the destination node.

Hexadecimal notation will be used hereinafter to refer to the SSRW bit positions. The hexadecimal notation is as follows:

| SSRW Bits | Hex |
|---|---|
| 0000 0000 = | 0 |
| 0000 0001 = | 1 |
| 0000 0011 = | 3 |
| 0000 0111 = | 7 |
| 0000 1110 = | E |
| 0000 1111 = | F etc. | where 0–9 are expressed in normal binary fashion and alphabetic characters are expressed as A=10, B=11, C=12, D=13, etc.

In this example, the interpretation of various return codes for a message being sent are as follows:
* SSRW—0 (hexadecimal)—the message was unable to make any progress towards the destination node. This is most likely due to congestion on all links leaving the source node.
* SSRW—1 (hexadecimal)—the message left the source node but never arrived at the destination node. This is most likely due to congestion along all search paths.
* SSRW—3 (hexadecimal)—the message left the source node and successfully arrived at the destination node. No further progress was made, implying there was congestion at the destination node, halting message transmission.
* SSRW—7 (hexadecimal)—the message successfully arrived at the destination node and left the network through the network port. The message was not successfully received by the entity attached to the network port. This might occur if there was no buffer space available at the destination node or if a CRC check showed the message had been corrupted during transmission due to link errors.
* SSRW—F (hexadecimal)—the message was successfully transmitted.

In the above example, a successful message transfer is indicated by a returned SSRW of F (hexadecimal). Partial progress is also reported in the SSRW. The source node can distinguish between network failures by examining Bits 0 and 1 and destination node failures by examining Bits 2 and 3.

There are several points to notice regarding the bit assignments of the SSRW. First, there is an implicit dependency between the bits. A source node does not expect Bit 1 of the SSRW to be set without Bit 0 being set. If this were not the case, the source node should assume that the SSRW was corrupted during transmission. Similarly, Bit 2 should never be set without Bits 1 and 0 being set. This hierarchical dependency of bits is extended throughout the SSRW. In general, however it is not a requirement that such dependencies exist in the SSRW. For example, one SSRW bit might be assigned to each node in the network. Then, as a message arrives at a node, either as an intermediate hop or as a terminating hop, the node would set its bit in the SSRW. The source node could then see through which nodes the message has traveled.

If bit dependencies are provided in the SSRW, then a certain ordering of events is implied. For instance, a message cannot be successfully transferred into a destination node's memory without first arriving at the destination node. Bit dependencies are useful for reporting message progress as a series of events occurring to a message as it moves from source to destination.

The individual bits of the SSRW can mark positive progress or errors depending upon the requirement of the application. For example, some bits of the SSRW might be used to denote communication errors. Nodes, by observing these error bits, would then be able to identify faulty links. Using error bits in an SSRW is different then sending negative acknowledgements separately along every path or reporting only worst case errors along a search path. Since the SSRW is a bitmask being accumulated by a parent node before being sent up the search tree, multiple error conditions may be reported simultaneously with only one status word.

Finally, since the SSRWs are bit-wise OR'd at each parent node, the bit assignments of events must be non-overlapping and unique. Thus, Bit X being set can never imply one of multiple conditions.

SSRW EXAMPLE 1—PARALLEL SEARCH

Figure 6:
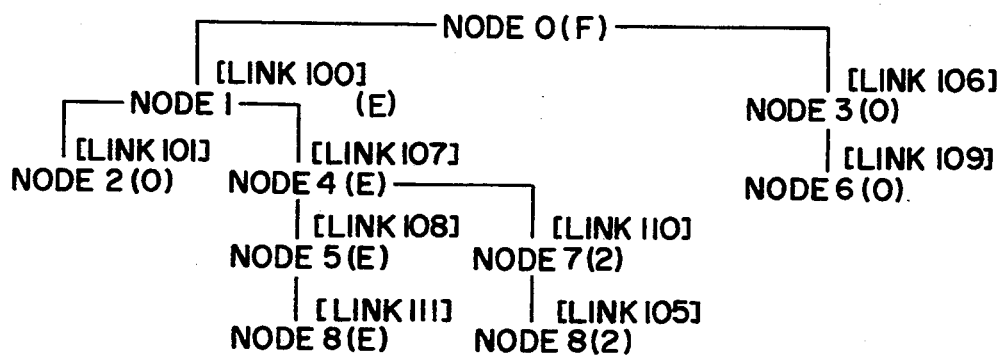
FIG. 6 is a search tree illustrating return codes from a parallel search.

Using the SSRW bit allocations illustrated above, consider the SSRWs returned during a typical search from Node 0 to Node 8. FIG. 6 shows the search path from Node 0 through Nodes 1, 4 and 5 reaching Node 8. Next to each node in the figure is the SSRW the node returns to its parent. For example, Node 5 returned an SSRW of E(hex) to its parent.

Nodes 2 and 6 each discontinue the search and return an SSRW of 0 to their parents. Reasons for failure might include network failures, node failures, or network congestion. Although two search paths reached the destination node in FIG. 6, only one was granted access to the network port. The steps of the search are as follows:

1. Node 0: initiates the message by resetting the network port's SSRW register to zero, sending the message over links 100 and 106 to Nodes 1 and 3, and setting the network port's Children register to reflect the allocation of links 100 and 106. Bit 0 of the network port's SSRW register is set to one since at least one link was allocated.
2. Nodes 1 and 3:
   a. Node 1: receives message from Node 0 over link 100, resets link 100's SSRW register to zero, retransmits message to Nodes 2 and 4 using links 101 and 107, and sets link 100's Children register to reflect the allocation of links 101 and 107.
   b. Node 3: receives message form Node 0 over link 106, resets link 106's SSRW register to zero, then retransmits message to Node 6 using link 109, and sets link 106's Children register to reflect the allocation of link 109.
3. Nodes 2, 4, and 6:
   a. Node 2: receives the message from Node 1 over link 101, resets link 101's SSRW register to zero. Since Node 2 cannot retransmit the message to its neighbors, it returns link 101's SSRW of 0 to its parent.
   b. Node 4: receives message from Node 1 over link 107, resets link 107's SSRW register to zero, retransmits message to Nodes 5 and 7 using links 103 and 110, and sets link 107's Children register to reflect the allocation of links 103 and 110.
   c. Node 6: receives message from Node 3 over link 109, resets link 109's SSRW register to zero. Since Node 6 cannot retransmit the message to its neighbors, it returns link 109's SSRW of 0 to its parent.

Nodes 1, 3, 5, and 7:
   a. Node 1: receives SSRW of 0 from Node 2, deallocates link 101's bit from link 100's Children register and bit-wise ORs the 0 into link 100's SSRW register. Node 1's 100 link now has an SSRW of 0.

b. Node 3: receives SSRW of 0 from Node 6, deallocates link 109's bit from link 106's Children register and bit-wise ORs the 1 into link 106's SSRW register. Node 3's 106 link now has an SSRW of 0. Since link 106's Children register has been set to zero, Node 3 returns link 106's SSRW of 0 to its parent.

c. Node 5: receives message from Node 4 over link 103, resets link 103's SSRW register to zero, retransmits message to Node 8 using link 111, and sets link 103's Children register to reflect the allocation of link 111.

d. Node 7: receives message from Node 4 over link 11, resets link 110's SSRW register to zero, retransmits message to Node 8 using link 105, and sets link 110's Children register to reflect the allocation of link 105.

5. Nodes 0 and 8:

a. Node 0: receives SSRW of 0 from Node 3, deallocates link 106's bit from the network port's Children register and bit-wise OR's the 0 into the network port's SSRW register. Node 0's network port now has an SSRW of 1.

b. Node 8: receives message from Node 5 over link 111, resets link 111's SSRW register to zero, sets Bit 1 of link 111's SSRW (since it is the destination node), allocates network port (setting Bit 2 of link 111's SSRW) and begins to process the message.

c. Node 8: receives message from Node 7 over link 105, resets link 105's SSRW (since it is the destination node), fails to allocate a network port since link 111 has already allocated the port, and returns link 105's SSRW of 2 to its parent (Node 7).

6. Nodes 7 and 8:

a. Node 7: receives SSRW of 2 from Node 8, deallocates link 105's bit from link 110's Children register and bit-wise ORs the 2 into link 110's SSRW register. Node 7's 110 link now has an SSRW of 2. Since link 110's Children register has been set to zero, Node 7 returns link 110's SSRW of 2 to its parent.

b. Node 8: successfully completes processing the message and sets Bit 3 of link 111's SSRW register. Node 8's 111 link now has an SSRW of E(hex). Since the message has completed, Node 8 returns link 111's SSRW of E(hex) to its parent.

7. Nodes 4 and 5 a. Node 4: receives SSRW of 2 from Node 7, deallocates link 110's bit from link 107's Children register and bit-wise ORs the 2 into link 107's SSRW register. Node 4's 107 link now has an SSRW of 2.

b. Node 5: receives SSRW of E(hex) from Node 8, deallocates link 111's bit from link 103's Children register and bit-wise OR's the E(hex) into link 103's SSRW register. Node 5's 103 link now has an SSRW of E(hex). Since link 103's Children register has been set to zero, Node 5 returns link 103's SSRW of E(hex) to its parent.

8. Node 4: receives SSRW of E(hex) from Node 5, deallocates link 103's bit from link 107's Children register and bit-wise ORs the E(hex) into link 107's SSRW register. Node 4's 107 link now has an SSRW of E(hex). Since link 107's Children register has been set to zero, Node 4 returns link 107's SSRW of E(hex) to its parent.

9. Node 1: receives SSRW of E(hex) from Node 4, deallocates link 107's bit from link 100's Children register and bit-wise ORs the E(hex) into link 100's SSRW register. Node 1's 100 link now has an SSRW of E(hex). Since link 100's Children register has been set to zero, Node 1 returns link 100's SSRW of E(hex) to its parent.

10. Node 0: receives SSRW of E(hex) from Node 1, deallocates link 100's bit from the network port's Children register and bit-wise ORs the E(hex) into the network port's SSRW register. Node O's network port now has an SSRW of F (hex). Since the network port's Children register has been set to zero, the message transfer is complete. By examining the SSRW of the network port, Node 0 determines that the message was sent successfully.

SSRW EXAMPLE 2—FAILED PARALLEL SEARCH

Figure 7:
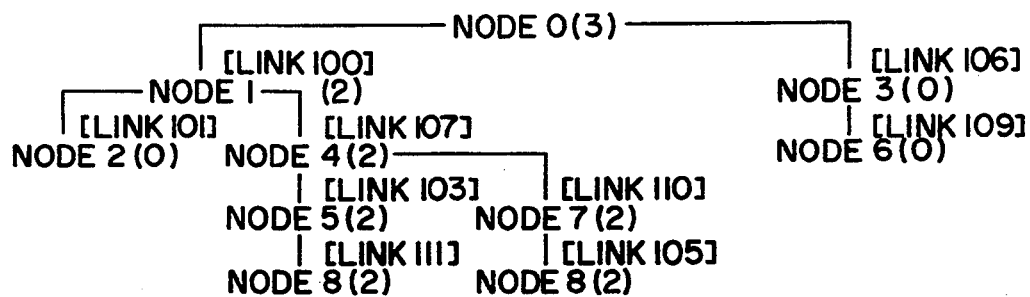
FIG. 7 is a search tree illustrating return codes from a failed parallel search.

Now, consider the unsuccessful message transfer illustrated in FIG. 7. In this search, Nodes 5 and 7 were both unable to allocate Node 8's network port. In this case, the steps of the search are identical to Example 1, however, Node 8 returns an SSRW of 2 to Node 5 in Step 5. Node 5 then returns an SSRW of 2 to Node 4. Node 4, therefore, returns an SSRW of 2 to Node 1. Node 1 returns an SSRW of 2 to Node 0 to end the search. By examining the SSRW, Node 0 can determine that the message reached the destination node but could not allocate the network port of Node 8. Node 0 is thus informed of the maximum message progress by examining the SSRW.

SSRW EXAMPLE 3—LINEAR SEARCH

Figure 8:
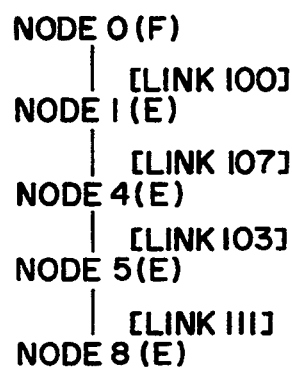
FIG. 8 is a search tree illustrating return codes from a linear search.

In FIG. 8, a linear search has been performed to reach the destination node. In this case, each time an intermediate node retransmits the message, only one output link is used. Therefore, these nodes set only one bit in the Children registers. Nothing else about the mechanism is changed.

SSRW EXAMPLE 4—PARALLEL SEARCH WITH INTERMEDIATE HOPS COUNT

For this example, the SSRW bits are assigned as follows:
* Bit 0—Message successfully made one hop (i.e., from source node to a first child node)
* Bit 1—Message successfully made two hops (i.e., from the first child node to next child node)
* Bit 2—Message successfully made three hops
* Bit 3—Message successfully arrived at destination node
* Bit 4—Message began transfer into memory of destination node
* Bit 5—Message finished transfer into memory of destination node
* Bit 6—Message CRC (cyclic redundancy check is good)

In this example, the first three bits of the SSRW are set by intermediate nodes. Before returning the SSRW to its parent, an intermediate node examines Bit 0 of the accumulated SSRW. If bit 0 is zero, the node sets Bit 0 to one and returns the updated SSRW to its parent. If the bit 0 is already set to one, then Bit 1 is examined instead. Following the same procedure, if Bit 1 is set to zero, the node sets Bit 1 to one and returns the modified SSRW to its parent. If Bit 1 is already set to one, then the node sets Bit 2 to one. A destination node does not set bit 0, as its setting of bits 3-6 implies that the hop to it was successfully completed.

The destination node sets Bit 3 of the SSRW register when the message arrives. Message arrival at a destination node, however, does not imply the node will accept or process the message. Thus, Bits 4, 5, and 6 are used to indicate successfully message delivery at the destination.

Although the above SSRW example requires a predetermined maximum path length through the network, the invention can be expanded to allow arbitrarily long SSRWs and, therefore, allow any number of intermediate nodes in a message transfer. It is often the case that the source node is uninterested in how many hops the message took before it reached the destination. In this case, Bits 0, 1, and 2 are not needed. Bit 3 would serve as the primary indicator of whether a message reached the destination node. In networks where the message path lengths can grow quite large, it may be desired only to mark arrival at the destination node. Also, in a parallel network it is improbable that every search path will fail. Thus using only one bit to mark arrival at the destination node would give sufficient message progress status. As stated above, the high order bits of the SSRW are allocated to destination node progress (in hex) and the low order bits are allocated to a hex number indicating the number of hops.

In this example, the interpretation of various return codes for a message being sent from Node 0 to Node 8 are as follows:

* SSRW=0 (hex)—the message was unable to make any progress towards the destination node. This is most likely due to congestion on all links leaving the source node.
* SSRW=1 (hex)—the message left the source node and arrived at either Nodes 1 or 3. No further progress was made. This implies some combination of links 101, 102, 107 and 109 being congested or faulty and nodes being down.
* SSRW=3 (hex)—the message left the source node, traversed one intermediate hop, and has arrived at a second intermediate node (along any of the possible paths) before message transmission failed.
* SSRW=7 (hex)—the message left the source node, traversed two intermediate hops, and has arrived at a third intermediate node (along any of the possible paths) before message transmission failed.
* SSRW=F (hex)—the message arrived at the destination node (along any path) but was not processed. This might occur if the destination node is busy with another message or out of memory buffer space.
* SSRW=1F (hex)—the message began transferring into memory at the destination node, but the transfer did not complete. This might occur if the destination node received a higher priority message and chose to abort the current message, or if the destination node ran out of memory while processing the message.
* SSRW=3F (hex)—the message finished transferring into memory at the destination node, but the CRC check failed. This might occur when link transmission errors corrupted the message.
* SSRW=7F (hex)—the message completed successfully.

A successful message transfer is indicated by a returned SSRW of 7F (hex). Partial progress is also reported in the SSRW. The source node can distinguish between search failures by examining the lower 4 bits of the SSRW and destination node errors by examining the higher 3 bits.

Figure 9:
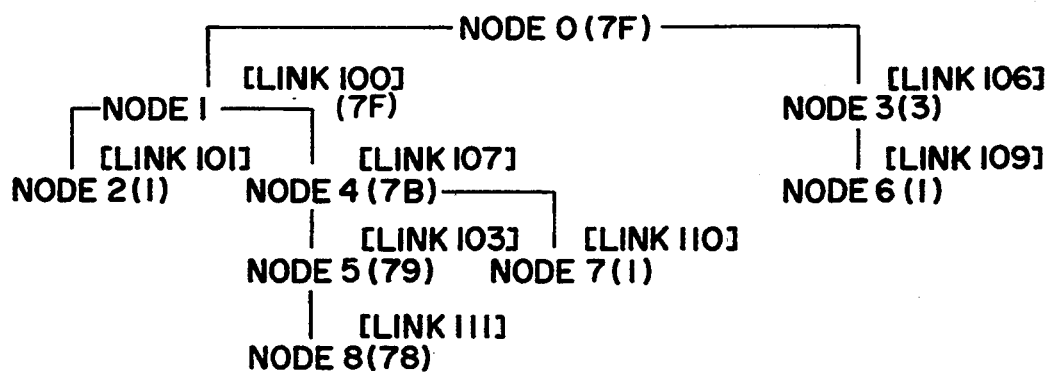
FIG. 9 is a search tree illustrating return codes from a successful parallel search.

Using the indicated SSRW bit allocations, consider the SSRW returned during a typical search from Node 0 to Node 8. FIG. 9 shows the search path from Node 0 through Nodes 1, 4, and 5 reaching Node 8.

Nodes 2, 6, and 7 each discontinued to search and returned an SSRW of 1 to their parents. The steps of the search are as follows:

1. Node 0: initiates message by resetting the network port's SSRW register to zero, sending message over links 100 and 106 to Nodes 1 and 3, and setting the network port's Children register to reflect the allocation of links 100 and 106.
2. Nodes 1 and 3:
    a. Node 1: receives message from Node 0 over link 100, resets link 100's SSRW register to zero, retransmits message to Nodes 2 and 4 using links 101 and 107, and sets link 100's Children register to reflect the allocation of links 101 and 107.
    b. Node 3: receives message from Node 0 over link 106, resets link 106's SSRW register to zero, retransmits message to Node 6 using link 109, and sets link 106's Children register to reflect the allocation of link 109.
3. Nodes 2, 4, and 6:
    a. Node 2: receives message from Node 1 over link 101 and resets link 101's SSRW register to zero. Since Node 2 cannot retransmit the message to its neighbors, it sets Bit 0 of link 101's SSRW to one and returns link 101's SSRW of one to its parent.
    b. Node 4: receives message from Node 1 over link 107, resets link 107's SSRW register to zero, retransmits message to Nodes 5 and 7 using links 103 and 110, and sets link 107's Children register to reflect the allocation of links 103 and 110.
    c. Node 6: receives message from Node 3 over link 109 and resets link 109's SSRW register to zero. Since Node 6 cannot retransmit the message to its neighbors, it sets Bit 0 of link 109's SSRW to one and returns link 109's SSRW of one to its parent.
4. Nodes 1, 3, 5 and 7:
    a. Node 1: receives SSRW of 1 from Node 2, deallocates link 101's bit from link 100's Children register and bit-wise ORs the one into link 100's SSRW register. Node 1's 100 link now has an SSRW of one.
    b. Node 3: receives SSRW of one from Node 6, deallocates link 109's bit from link 106's Children register and bit-wise OR's the one into link 106's SSRW register. Node 3's 106 link now has an SSRW of one. Since link 106's Children register has been set to zero, Node 3 sets Bit 1 (since Bit 0 is already set) of link 106's SSRW to one and returns link 106's SSRW of 3 to its parent.
    c. Node 5: receives message from Node 4 over link 103, resets link 103's SSRW register to zero, retransmits message to Node 8 using link 111, and sets link 103's Children register to reflect the allocation of link 111.
    d. Node 7: receives message from Node 4 over link 110, resets link 110's SSRW register to zero. Since Node 7 cannot retransmit the message to its neighbors, it sets Bit 0 of link 110's SSRW to one and returns link 110's SSRW of one to its parent.
5. Nodes 0, 4 and 8:
    a. Node 0: receives SSRW of 3 from Node 3, deallocates link 106's bit from the network port's Children register and bit-wise ORs the 3 into the network port's SSRW register. Node 0's network port now has an SSRW of 3.

b. Node 4: receives SSRW of one from Node 7, deallocates link 110's bit from link 107's Children register and bit-wise ORs the one into link 107's SSRW register. Node 4's 107 link now has an SSRW of one.

c. Node 8: receives message from Node 5 over link 111, resets link 111's SSRW register to zero, sets Bit 3 of link 111's SSRW (since it is the destination node), and begins to process message.

6. Node 8: successfully completes processing message, sets Bits 4, 5, and 6 of link 111's SSRW. Node 8's 111 link now has an SSRW of 78 (hex). Since the message has completed, Node 8 returns link 111's SSRW of 78 (hex) to its parent.

7. Node 5: receives SSRW of 78(hex) from Node 8, deallocates link 111's bit from link 103's Children register and bit-wise ORs the 78 (hex) into link 103's SSRW register. Node 5's 103 link now has an SSRW of 78 (hex). Since link 103's Children register has been set to zero, Node 5 sets Bit 0 of link 103's SSRW and returns link 103's SSRW of 79 (hex) to its parent.

8. Node 4: receives SSRW of 79 (hex) from Node 5, deallocates link 103's bit from link 107's Children register and bit-wise ORs the 79 (hex) into link 107's SSRW register. Node 4's 107 link now has an SSRW of 79 (hex). Since link 107's Children register has been set to zero, Node 4 sets Bit 1 (since Bit 0 is already set) of link 107's SSRW and returns the SSRW of 7B (hex) to its parent.

9. Node 1: receives SSRW of 7B (hex) from Node 4, deallocates link 107's bit from link 100's Children register and bit-wise ORs the 7B (hex) into link 100's SSRW register. Node 1's 100 link now has an SSRW register of 7B (hex). Since link 100's Children register has been set to zero, Node 1 sets Bit 2 (since Bits 0 and 1 are already set) of link 100's SSRW and returns the SSRW of 7F (hex) to its parent.

10. Node 0: receives SSRW of 7F (hex) from Node 1, deallocates link 100's bit from the network port's Children register and bit-wise ORs the 7F (hex) into the network port's SSRW register. Node O's network port now has an SSRW of 7F (hex). Since the network port's Children register has been set to zero, the message transfer is complete. By examining the network port's SSRW, Node 0 determines that the message was sent successfully.

As can be seen from the above:

1. The status reported represents successful progress rather than failure and allows the maximum progress to be determined, as contrasted with previous schemes which report error codes.
2. A bit-mask with one bit per reported event is used to report status in lieu of previous schemes which use binary integers to report status.
3. Multiple path network transmissions are seen as trees. This allows status to be reduced to a single word by having every intermediate node of the tree combine the status received from its branches.
4. Status is combined at each node using a binary bit-wise OR operation as contrasted to previous schemes where status summary operations are content dependent.
5. The status reporting mechanism within every node is duplicated with one set of registers for every incoming link (assuming one active message per link at a time).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A multiple node network comprising (i) a source node wherein a message is originated, (ii) a destination node where inter-node transmission of said message is terminated and (iii) one or more intermediate node(s) through which said message travels before arriving at said destination node, said intermediate node(s) being connected between said source node and said destination node, said network including a message progress reporting system wherein a received status word enables a source node to determine a message's transmission progress through said multiple node network, a node comprising:

transmitter means coupled via communication links to a plurality of child nodes, for transmitting a message to at least one said child node;

status word logic means for storing a status word which indicates transmission progress of said message;

receiving means connecting a child node to said status word logic means, for receiving a status word from said child node, said status word indicating said message's transmission progress at least at said child node, and for creating an updated status word in said status word logic means in accordance with said status word received from said child node;

child register means coupled to said receiving means for indicating when a status word has been received from each child node to which said message was transmitted; and transmitter means for transmitting said updated status word from said status word logic means to a source node when said child register means indicates receipt of status words from all child nodes to which said message was transmitted and said status word logic means has updated said status word in accordance with said received status words.

2. The multiple node network as recited in claim 1 wherein said receiving means OR's a received status word from a child node, on a bit-wise basis, with a stored status word contained within said status word logic means to update said stored status word.

3. The multiple node network as recited in claim 2, wherein said transmitter means transmits to a source node only a single status word for each message.

4. The multiple node network as recited in claim 3, said parent node further comprising:

destination register means coupled to said transmitter means for indicating child nodes to which a message was transmitted.

5. The multiple node network as recited in claim 4, said parent node further comprising:

means coupled to said destination register means and said transmitter means, and for manifesting a value indicating that all child nodes have responded with a status word, said manifesting operative to enable said transmitter means to transmit said updated status word.

6. A system for reporting message progress in a network that comprises a plurality of nodes, said system including source nodes and destination nodes, a source node providing a message to a destination node, the combination comprising:

a. transmission means in each destination node for transmitting to a respective source node, a multi-bit status word which indicates progress of a message up to and at said destination node;

b. receiving means in a said respective source node for accumulating a said multi-bit status word, associated with a message, from status words received from all destination nodes to which said message was transmitted, said receiving means including child register means for indicating that a status word has been received from all destination nodes to which said message was transmitted, said accumulating employing a logical "or" operation of corresponding bits of said multi-bit status words receiving from all said destination nodes so as to create a single status word indicating progress of said message; and c. means at each said source node for parsing a received, accumulated, status word to ascertain a said message's progress.

7. A system as recited in claim 6, wherein said network includes a plurality of parent and child nodes, a plurality of levels of said parent and child nodes comprising a tree arrangement of nodes, no child node transmitting more than one status word per message to its parent node.

8. A system as recited in claim 7, wherein each said parent node only transmits a status word after status words from all of child nodes receiving a message from said parent node, have been received by a said parent node.

9. A system as recited in claim 8, wherein each said parent node includes a child node register which indicates child nodes to which a message has been transmitted.

10. A system as recited in claim 9, wherein each said multi-bit status word includes data indicative of a message's transmission progress from input to output in a node.

11. A system as recited in claim 10, wherein each said multi-bit status word further includes data indicating a number of levels of a tree over which a message has traversed.

* * * * *

UNITED STATES PATENT AND TRADEMARK OFFICE
CERTIFICATE OF CORRECTION

PATENT NO. : 5,404,565
DATED     : April 4, 1995
INVENTOR(S) : Gould et al.

It is certified that error appears in the above-identified patent and that said Letters Patent is hereby corrected as shown below:

In col. 14, Claim 4, line 52, the word "parent" should be deleted.

In col. 14, Claim 5, line 57, the word "parent" should be deleted.

In col. 14, Claim 5, line 59, the phrase "manifesting a value" should be deleted.

In co. 14, Claim 5, line 61, the word "manifesting" should be deleted and the word --indicating-- should be inserted in place of.

Signed and Sealed this

Eighteenth Day of July, 1995

*Attest:*

BRUCE LEHMAN

*Attesting Officer*     *Commissioner of Patents and Trademarks*